US011304365B2

(12) United States Patent
Orvis

(10) Patent No.: US 11,304,365 B2
(45) Date of Patent: Apr. 19, 2022

(54) RAKE SYSTEM FOR REMOVING FLOATING AND SUBMERGED VEGETATION AND DEBRIS FROM PONDS

(71) Applicant: James Orvis, Crosslake, MN (US)

(72) Inventor: James Orvis, Crosslake, MN (US)

(*) Notice: Subject to any disclaimer, the term of this patent is extended or adjusted under 35 U.S.C. 154(b) by 153 days.

(21) Appl. No.: 16/601,939

(22) Filed: Oct. 15, 2019

(65) Prior Publication Data

US 2021/0105935 A1  Apr. 15, 2021

(51) Int. Cl.
*A01D 7/00* (2006.01)
*A01D 44/00* (2006.01)

(52) U.S. Cl.
CPC ............ *A01D 7/00* (2013.01); *A01D 44/00* (2013.01)

(58) Field of Classification Search
CPC . A01D 44/00; A01D 44/02; A01D 7/00–7/10; A01K 63/10; A01K 80/00; E04H 1/1609; E01H 1/12; E01H 12/004; E01H 12/00
See application file for complete search history.

(56) References Cited

U.S. PATENT DOCUMENTS

| 97,420 | A | * | 11/1869 | Mayhew | ............... A01K 80/00 37/316 |
| 1,014,250 | A | | 12/1899 | Norman | |
| 1,342,293 | A | | 6/1920 | Frank et al. | |
| 2,251,626 | A | | 8/1941 | Harry et al. | |
| 2,961,817 | A | | 11/1960 | Mitchell et al. | |
| 3,394,483 | A | | 7/1968 | Thomas et al. | |
| 3,407,577 | A | * | 10/1968 | Chesterg | ............... A01D 44/00 56/8 |
| 3,546,858 | A | * | 12/1970 | Chaplin | ............... A01D 44/00 56/9 |
| 3,863,237 | A | | 1/1975 | Doerr | |
| 4,137,693 | A | | 2/1979 | Thompson et al. | |
| 4,248,033 | A | | 2/1981 | Bryant | |
| 4,375,299 | A | * | 3/1983 | Laven | ............... A01D 44/00 172/376 |
| 4,713,929 | A | | 12/1987 | Smith | |
| 4,768,331 | A | | 9/1988 | Jones | |
| 4,815,260 | A | | 3/1989 | Desrosiers | |
| 4,828,690 | A | | 5/1989 | Montez | |
| 4,852,337 | A | | 8/1989 | Peterson | |
| 5,074,105 | A | | 12/1991 | Roth | |
| 5,079,905 | A | | 1/1992 | Bergstrom | |
| 5,110,168 | A | * | 5/1992 | Petrillo | ............... A63B 47/021 294/19.2 |
| 5,287,935 | A | | 2/1994 | Foeller | |

(Continued)

FOREIGN PATENT DOCUMENTS

GB  2459242 A * 10/2009 ............... A01D 7/00

*Primary Examiner* — Alicia Torres
*Assistant Examiner* — Madeline I Runco
(74) *Attorney, Agent, or Firm* — Mitchell A Rossman; Terra Nova Patent Law, PLLC

(57) ABSTRACT

The present invention provides a rake system for removing floating and submerged vegetation and debris from ponds. The rake system includes: a handle; a frame that includes a first cutting member, a second cutting member, one or more entrapment meshes, a floating member; and a line connected the proximal end of the handle. Methods for removing floating and submerged vegetation and debris from ponds are also disclosed.

19 Claims, 6 Drawing Sheets

(56) References Cited

U.S. PATENT DOCUMENTS

| | | | |
|---|---|---|---|
| 5,305,585 A * | 4/1994 | Cousineau | A01D 44/00 239/754 |
| 5,450,713 A | 9/1995 | Rohde et al. | |
| 5,450,731 A | 9/1995 | DiPeri | |
| 5,493,850 A | 2/1996 | Torkelson | |
| 5,511,366 A | 4/1996 | Roth | |
| 5,603,204 A | 2/1997 | Harvey-Rioux et al. | |
| 5,915,431 A * | 6/1999 | Doussan | E04H 4/1609 15/1.7 |
| 6,748,728 B2 | 6/2004 | Hay | |
| 7,022,223 B2 | 4/2006 | Lovestead et al. | |
| 7,111,741 B2 | 9/2006 | Bramante | |
| 7,314,571 B2 | 1/2008 | Lovestead et al. | |
| 7,603,836 B2 * | 10/2009 | Grosjean | A01D 44/00 210/237 |
| 7,771,593 B2 | 8/2010 | Coffman et al. | |
| 7,832,105 B2 * | 11/2010 | Vogel | A01D 44/00 30/166.3 |
| 8,006,474 B2 * | 8/2011 | Baker | A01D 44/00 56/400.04 |
| 8,220,232 B1 | 7/2012 | Marvin | |
| D668,053 S * | 10/2012 | Cummings | D4/116 |
| 8,479,481 B2 | 7/2013 | OToole et al. | |
| 9,010,828 B2 | 4/2015 | Draxten | |
| 9,295,193 B2 | 3/2016 | Mayer | |
| 2003/0172634 A1 | 9/2003 | Hay | |
| 2004/0226896 A1 | 11/2004 | Lovestead et al. | |
| 2005/0044837 A1 | 3/2005 | OToole et al. | |
| 2005/0218044 A1 | 10/2005 | Bramante | |
| 2006/0175267 A1 | 8/2006 | Lovestead et al. | |
| 2007/0199290 A1 | 8/2007 | Main Jr. | |
| 2009/0193776 A1 * | 8/2009 | Grosjean | A01D 44/00 56/8 |
| 2010/0012563 A1 | 1/2010 | Coffman et al. | |
| 2010/0263347 A1 | 10/2010 | Baker | |
| 2010/0269469 A1 | 10/2010 | Klobukowski | |
| 2012/0124957 A1 | 5/2012 | Meyers | |
| 2014/0284949 A1 * | 9/2014 | Draxten | B66F 19/00 294/211 |
| 2015/0052870 A1 | 2/2015 | Mayer | |

* cited by examiner

RAKE SYSTEM FOR REMOVING FLOATING AND SUBMERGED VEGETATION AND DEBRIS FROM PONDS

RELATED APPLICATIONS

This application claims priority to U.S. Provisional Patent Application Ser. No. 62/776,702 filed Dec. 7, 2018, which is hereby incorporated by reference in its entirety for all purposes.

BACKGROUND OF THE INVENTION

Overgrown submerged and floating vegetation and debris can despoil waterfront property and severely limit recreational activities such as swimming, boating, and fishing. As a result, numerous devices have been developed to physically remove the vegetation and debris from waterfront property. These tools range from common rakes to complicated devices and either clean the surface of the water or the lake bottoms, but not both.

What is needed is a lightweight device that removes floating and submerged vegetation and debris from lakefront property both near and away from the shoreline.

SUMMARY OF THE INVENTION

The present invention provides a rake system for removing floating and submerged vegetation and debris from ponds. The rake system includes: a handle; a frame that includes a first cutting member, a second cutting member, one or more entrapment meshes, a floating member; and a line connected the proximal end of the handle. Methods for removing floating and submerged vegetation and debris from ponds are also disclosed.

The present invention provides a rake system for removing floating and submerged vegetation and debris from ponds with the following advantages: (1) the rake system rakes the bottom of the pond, (2) the rake system scoops up debris (e.g., zebra mussels, shells, rocks, weeds, muck, and the like) from the bottom of the ponds without losing it, (3) the rake system simultaneously cuts vegetation and pulls it out, and (4) skims the surface of the pond and collects floating weeds and algae. The rake system can be used as a hand rake or it can be thrown into the water and retrieved with the attached rope.

The present invention provides a rake system for removing floating and submerged vegetation and debris from ponds. The rake system includes: a handle having a proximal end and a distal end; a frame having a first member, a second member, and a third member, wherein the first member has a first surface, a second surface, a first edge, a second edge, a third edge, and a fourth edge, wherein the first surface of the first member is connected to the distal end of the handle with the proviso that a pivot is not used to connect the first surface of the first member to the distal end of the handle, wherein the first edge of the first member is connected to a first cutting member having two or more first teeth extending parallel away from the first edge, wherein the second edge of the first member is connected to a second cutting member having two or more second teeth, wherein the second cutting member having two or more second teeth extend from the second edge and are downwardly sloped from the first surface, wherein the third edge of the first member is connected to a first surface of the second member, wherein the fourth edge of the first member is connected to a first surface of the third member, wherein the first member, the second member, the third member, and a combination thereof each independently include one or more entrapment meshes, wherein the first member, the second member, and the third member form a receptacle having an open face at the first edge and the second edge of the first member and having a first opposed side and a second opposed side, and a line connected the proximal end of the handle.

In one embodiment, the handle is a tube. In one embodiment, the handle includes a metal, a wood, a plastic, a composite, a laminate, a fiberglass or a combination thereof. In one embodiment, the handle includes an aluminum tube. In one embodiment, the rake system further includes including a first support member connected to the first edge of the first member and to the second edge of the first member. In one embodiment, the first member, the second member, and the third member each independently include a metal, a plastic, a composite, a composite, or a combination thereof. In one embodiment, the first member, the second member, and the third member each independently include aluminum, steel, or a combination thereof. In one embodiment, the first member, the second member, and the third member each independently include aluminum. In one embodiment, the first cutting member includes a metal, a wood, a plastic, a composite, a composite, a fiberglass, or a combination thereof. In one embodiment, the first cutting member includes a stainless steel.

In one embodiment, the two or more first teeth each independently have a V-shaped cross section. In one embodiment, the two or more first teeth each independently cuts pond weeds close to the bottom of the pond and scoop the vegetation and unwanted debris into the receptacle formed in the frame. In one embodiment, the second cutting member includes a metal, a wood, a plastic, a composite, a composite, a fiberglass, or a combination thereof. In one embodiment, the second cutting member includes aluminum. In one embodiment, the two or more second teeth each independently have a V-shaped cross section. In one embodiment, the two or more second teeth each independently rake a bottom of the pond and scoop the vegetation and unwanted debris into the receptacle formed in the frame. In one embodiment, the two or more second teeth are each independently larger than each of the two or more first teeth. In one embodiment, the two or more second teeth are each independently the same size as each of the two or more first teeth. In one embodiment, the two or more second teeth are each independently smaller than each of the two or more first teeth.

In one embodiment, the one or more entrapment meshes each independently include a metal, a plastic, a composite, or a combination thereof. In one embodiment, the one or more entrapment meshes each independently include aluminum, steel, or a combination thereof. In one embodiment, the one or more entrapment meshes each independently include aluminum. In one embodiment, the rake system further includes a floating member detachably connected to the first surface of the first member. In one embodiment, the floating member includes a sealed tube, a foam, a bladder, or a combination thereof. In one embodiment, the rake system further includes a spool connected to the proximal end of the handle. In one embodiment, the line is connected the proximal end of the handle with a pin assembly.

The present invention provides a rake system for removing floating and submerged vegetation and debris from ponds. The rake system includes: a handle having a proximal end and a distal end; a metal frame having a first member, a second member, and a third member, wherein the first member has a first surface, a second surface, a first edge, a second edge, a third edge, and a fourth edge, wherein the first surface of the first member is connected to the distal end of the handle with the proviso that a pivot is not used to connect the first surface of the first member to the distal end of the handle, wherein the first edge of the first member is connected to a first cutting member having two or more first teeth extending parallel away from the first edge, wherein the two or more first teeth each independently have a V-shaped cross section, wherein the second edge of the first member is connected to a second cutting member having two or more second teeth, wherein the two or more second teeth each independently have a V-shaped cross section, wherein the second cutting member having two or more second teeth extend from the second edge and are downwardly sloped from the first surface, wherein the third edge of the first member is connected to a first surface of the second member, wherein the fourth edge of the first member is connected to a first surface of the third member, wherein the first member, the second member, the third member, and a combination thereof each independently include one or more entrapment meshes, wherein the first member, the second member, and the third member form a receptacle having an open face at the first edge and the second edge of the first member and having a first opposed side and a second opposed side; a floating member detachably connected to the first surface of the first member; a line connected the proximal end of the handle; a spool connected to the proximal end of the handle, and wherein the line is wound around the spool.

In one embodiment, the handle includes a metal, a wood, a plastic, a composite, a laminate, a fiberglass or a combination thereof. In one embodiment, the handle includes an aluminum tube. In one embodiment, the rake system further includes including a first support member connected to the first edge of the first member and to the second edge of the first member. In one embodiment, the first member, the second member, and the third member each independently include aluminum, steel, or a combination thereof. In one embodiment, the first member, the second member, and the third member each independently include aluminum. In one embodiment, the first cutting member includes a metal. In one embodiment, the first cutting member includes a stainless steel. In one embodiment, the two or more second teeth each independently cuts pond weeds close to the bottom of the pond and scoop the vegetation and unwanted debris into the receptacle formed in the metal frame. In one embodiment, the second cutting member includes a metal.

In one embodiment, the second cutting member includes aluminum. In one embodiment, the two or more second teeth each independently rake a bottom of the pond and scoop the vegetation and unwanted debris into the receptacle formed in the metal frame. In one embodiment, the floating member includes a foam, a sealed container such as a sealed pipe, a sealed bladder, or the like.

In one embodiment, the two or more second teeth are each independently larger than each of the two or more first teeth. In one embodiment, the two or more second teeth are each independently the same size as each of the two or more first teeth. In one embodiment, the two or more second teeth are each independently smaller than each of the two or more first teeth. In one embodiment, the one or more entrapment meshes each independently include a metal. In one embodiment, the one or more entrapment meshes each independently include aluminum, steel, or a combination thereof. In one embodiment, the one or more entrapment meshes each independently include aluminum.

The present invention provides a rake system for removing floating and submerged vegetation and debris from ponds. The rake system includes: a tubular handle having a proximal end and a distal end; a metal frame having a first member, a second member, and a third member, wherein the first member has a first surface, a second surface, a first edge, a second edge, a third edge, and a fourth edge, wherein a first support member is connected to the first edge of the first member and to the second edge of the first member, wherein the first surface of the first member is connected to the distal end of the tubular handle at about a 15 degree angle, wherein the first edge of the first member is connected to a first cutting member having two or more first teeth extending parallel away from the first edge, wherein the two or more first teeth each independently have a V-shaped cross section, wherein the second edge of the first member is connected to a second cutting member having two or more second teeth, wherein the two or more second teeth each independently have a V-shaped cross section, wherein the second cutting member having two or more second teeth extend from the second edge and are downwardly sloped from the first surface, wherein the two or more second teeth are each independently larger than each of the two or more first teeth, wherein the third edge of the first member is connected to a first surface of the second member, wherein the fourth edge of the first member is connected to a first surface of the third member, wherein the first member, the second member, the third member, and a combination thereof each independently include one or more entrapment meshes, wherein the first member, the second member, and the third member form a receptacle having an open face at the first edge and the second edge of the first member and having a first opposed side and a second opposed side; a foam floating member detachably connected to the first surface of the first member; a line connected the proximal end of the tubular handle; a spool connected to the proximal end of the tubular handle, and wherein the line is wound around the spool.

In one embodiment, the tubular handle includes an aluminum tube. In one embodiment, the first member, the second member, and the third member each independently include aluminum. In one embodiment, the first cutting member includes a stainless steel. In one embodiment, the second cutting member includes aluminum. In one embodiment, the one or more entrapment meshes each independently include aluminum.

The present invention provides method for removing submerged vegetation and debris from the bottom of ponds. The method includes: providing a rake system including: a handle having a proximal end and a distal end; a metal frame having a first member, a second member, and a third member, wherein the first member has a first surface, a second surface, a first edge, a second edge, a third edge, and a fourth edge, wherein the first surface of the first member is connected to the distal end of the handle with the proviso that a pivot is not used to connect the first surface of the first member to the distal end of the handle, wherein the first edge of the first member is connected to a first cutting member having two or more first teeth extending parallel away from the first edge, wherein the two or more first teeth each independently have a V-shaped cross section, wherein the second edge of the first member is connected to a second cutting member having two or more second teeth, wherein the two or more second teeth each independently have a V-shaped cross section, wherein the second cutting member having two or more second teeth extend from the second edge and are downwardly sloped from the first surface, wherein the third edge of the first member is connected to a first surface of the second member, wherein the fourth edge of the first member is connected to a first surface of the third member, wherein the first member, the second member, the third member, and a combination thereof each independently include one or more entrapment meshes, wherein the first member, the second member, and the third member form a receptacle having an open face at the first edge and the second edge of the first member and having a first opposed side and a second opposed side; a floating member detachably connected to the first surface of the first member; a line connected the proximal end of the handle; a spool connected to the proximal end of the handle, and wherein the line is wound around the spool; removing the floating member from the rake system; and dragging the rake system along the bottom of the pond.

The present invention provides method for removing submerged vegetation and debris from the bottom of ponds. The method includes: providing a rake system including: a handle having a proximal end and a distal end; a metal frame having a first member, a second member, and a third member, wherein the first member has a first surface, a second surface, a first edge, a second edge, a third edge, and a fourth edge, wherein the first surface of the first member is connected to the distal end of the handle with the proviso that a pivot is not used to connect the first surface of the first member to the distal end of the handle, wherein the first edge of the first member is connected to a first cutting member having two or more first teeth extending parallel away from the first edge, wherein the two or more first teeth each independently have a V-shaped cross section, wherein the second edge of the first member is connected to a second cutting member having two or more second teeth, wherein the two or more second teeth each independently have a V-shaped cross section, wherein the second cutting member having two or more second teeth extend from the second edge and are downwardly sloped from the first surface, wherein the third edge of the first member is connected to a first surface of the second member, wherein the fourth edge of the first member is connected to a first surface of the third member, wherein the first member, the second member, the third member, and a combination thereof each independently include one or more entrapment meshes, wherein the first member, the second member, and the third member form a receptacle having an open face at the first edge and the second edge of the first member and having a first opposed side and a second opposed side; a floating member detachably connected to the first surface of the first member; a line connected the proximal end of the handle; a spool connected to the proximal end of the handle, and wherein the line is wound around the spool; removing the floating member from the rake system; unwinding the line from the spool; tossing the rake system into the pond, and pulling the line to drag the rake system along the bottom of the pond.

The present invention provides method for removing submerged vegetation and debris from the surface of ponds. The method includes: providing a rake system including: a handle having a proximal end and a distal end; a metal frame having a first member, a second member, and a third member, wherein the first member has a first surface, a second surface, a first edge, a second edge, a third edge, and a fourth edge, wherein the first surface of the first member is connected to the distal end of the handle with the proviso that a pivot is not used to connect the first surface of the first member to the distal end of the handle, wherein the first edge of the first member is connected to a first cutting member having two or more first teeth extending parallel away from the first edge, wherein the two or more first teeth each independently have a V-shaped cross section, wherein the second edge of the first member is connected to a second cutting member having two or more second teeth, wherein the two or more second teeth each independently have a V-shaped cross section, wherein the second cutting member having two or more second teeth extend from the second edge and are downwardly sloped from the first surface, wherein the third edge of the first member is connected to a first surface of the second member, wherein the fourth edge of the first member is connected to a first surface of the third member, wherein the first member, the second member, the third member, and a combination thereof each independently include one or more entrapment meshes, wherein the first member, the second member, and the third member form a receptacle having an open face at the first edge and the second edge of the first member and having a first opposed side and a second opposed side; a floating member detachably connected to the first surface of the first member; a line connected the proximal end of the handle; a spool connected to the proximal end of the handle, and wherein the line is wound around the spool; unwinding the line; tossing the rake system into the pond, and pulling the line to drag the rake system along the surface of the pond.

BRIEF DESCRIPTION OF THE DRAWINGS

Embodiments of the invention may be best understood by referring to the following description and accompanying drawings, which illustrate such embodiments. In the drawings.

Figure 1:
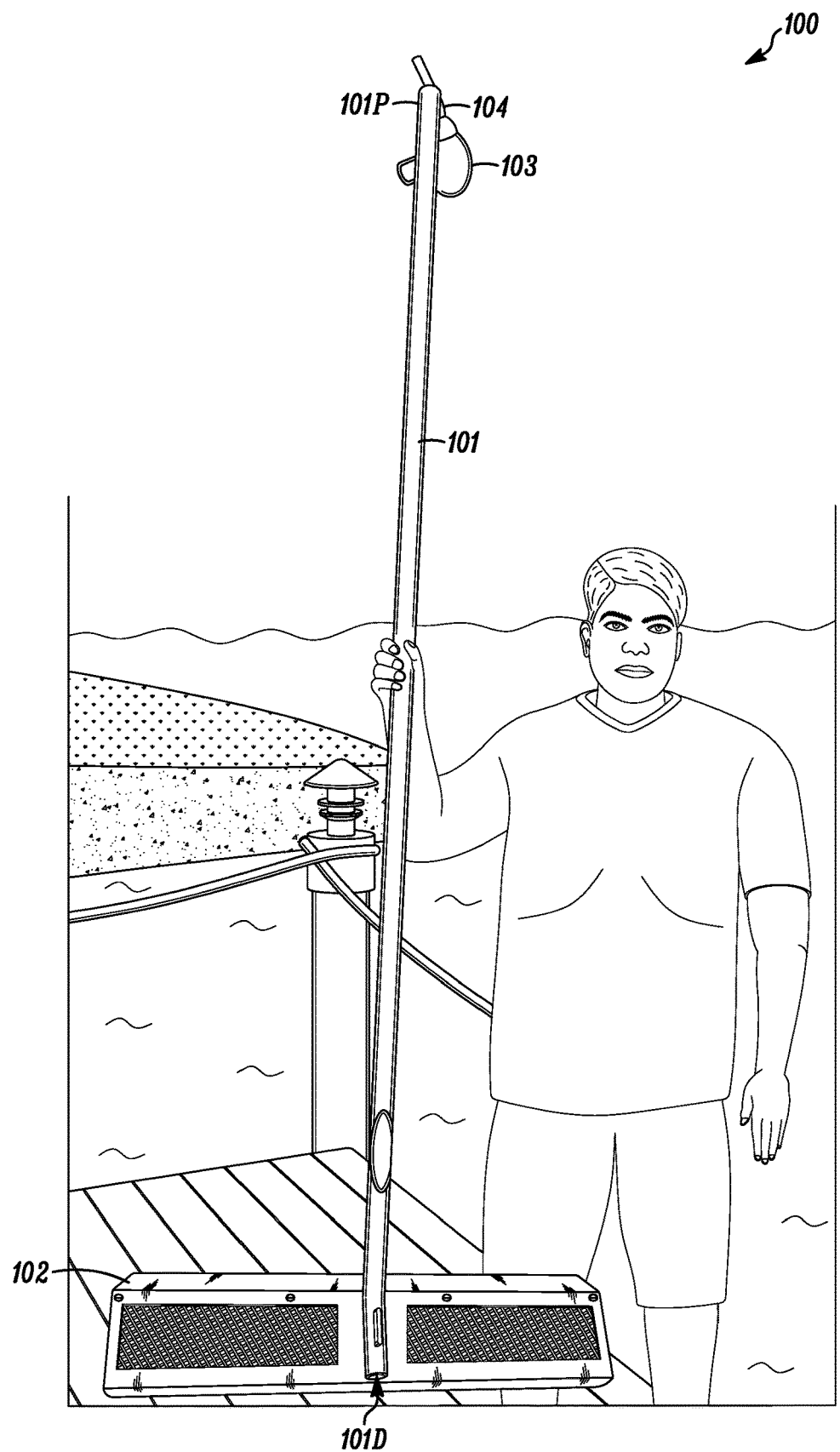
FIG. 1 is a perspective view drawing illustrating an exemplary rake system without a floating member.

The drawings are not necessarily to scale. Like numbers used in the figures refer to like components, steps, and the like. However, it will be understood that the use of a number to refer to a component in a given figure is not intended to limit the component in another figure labeled with the same number.

DETAILED DESCRIPTION OF THE INVENTION

The present invention provides a rake system for removing floating and submerged vegetation and debris from ponds. The rake system includes: a handle; a frame that includes a first cutting member, a second cutting member, one or more entrapment meshes, a floating member; and a line connected the proximal end of the handle. Methods for removing floating and submerged vegetation and debris from ponds are also disclosed.

The following detailed description includes references to the accompanying drawings, which form a part of the detailed description. The drawings show, by way of illustration, specific embodiments in which the invention may be practiced. These embodiments, which are also referred to herein as "examples," are described in enough detail to enable those skilled in the art to practice the invention. The embodiments may be combined, other embodiments may be utilized, or structural, and logical changes may be made without departing from the scope of the present invention. The following detailed description is, therefore, not to be taken in a limiting sense, and the scope of the present invention is defined by the appended claims and their equivalents.

Before the present invention is described in such detail, however, it is to be understood that this invention is not limited to particular variations set forth and may, of course, vary. Various changes may be made to the invention described and equivalents may be substituted without departing from the true spirit and scope of the invention. In addition, many modifications may be made to adapt a particular situation, material, composition of matter, process, process act(s) or step(s), to the objective(s), spirit or scope of the present invention. All such modifications are intended to be within the scope of the claims made herein.

Methods recited herein may be carried out in any order of the recited events which is logically possible, as well as the recited order of events. Furthermore, where a range of values is provided, it is understood that every intervening value, between the upper and lower limit of that range and any other stated or intervening value in that stated range is encompassed within the invention. Also, it is contemplated that any optional feature of the inventive variations described may be set forth and claimed independently, or in combination with any one or more of the features described herein.

The referenced items are provided solely for their disclosure prior to the filing date of the present application. Nothing herein is to be construed as an admission that the present invention is not entitled to antedate such material by virtue of prior invention.

Unless otherwise indicated, the words and phrases presented in this document have their ordinary meanings to one of skill in the art. Such ordinary meanings can be obtained by reference to their use in the art and by reference to general and scientific dictionaries, for example, *Webster's Third New International Dictionary*, Merriam-Webster Inc., Springfield, M A, 1993 and *The American Heritage Dictionary of the English Language*, Houghton Mifflin, Boston Mass., 1981.

References in the specification to "one embodiment" indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The following explanations of certain terms are meant to be illustrative rather than exhaustive. These terms have their ordinary meanings given by usage in the art and in addition include the following explanations.

As used herein, the term "and/or" refers to any one of the items, any combination of the items, or all of the items with which this term is associated.

As used herein, the singular forms "a," "an," and "the" include plural reference unless the context clearly dictates otherwise. It is further noted that the claims may be drafted to exclude any optional element. As such, this statement is intended to serve as antecedent basis for use of such exclusive terminology as "solely," "only," and the like in connection with the recitation of claim elements, or use of a "negative" limitation.

As used herein, the term "comprising" or "comprises" is intended to mean that the compositions and methods include the recited elements, but not excluding others.

As used herein, the terms "connected" and "coupled" means the joining of two members directly or indirectly to one another. Such joining may be stationary in nature or movable in nature and/or such joining may allow for the flow of fluids, electricity, electrical signals, or other types of signals or communication between two members. Such joining may be achieved with the two members or the two members and any additional intermediate members being integrally formed as a single unitary body with one another or with the two members or the two members and any additional intermediate members being attached to one another. Such joining may be permanent in nature or alternatively may be removable or releasable in nature.

As used herein, the term "debris" refers to discarded man-made objects such as plastic, paper, wood, cans, glass, and other trash. The term "debris" also refers to living and dead animals (e.g., fish, clams, zebra mussels, etc.).

As used herein, the phrases "operatively connected" and "operatively coupled" refers to bringing two or more items together or into relationship with each other such that they may operate together or allow transfer of information between the two or more items.

As used herein, the terms "include," "for example," "such as," and the like are used illustratively and are not intended to limit the present invention.

As used herein, the terms "invention," "the invention," "this invention," "the present invention" and "disclosure" are intended to refer broadly to all of the subject matter of this patent and the patent claims below. Statements containing these terms should be understood not to limit the subject matter described herein or to limit the meaning or scope of the patent claims below. The subject matter should be understood by reference to appropriate portions of the entire specification of this patent, any or all drawings and each claim.

As used herein, the terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

As used herein, the term "pond" refers to any body of water such as a pond, a lake, a river, a creek, a swamp, and the like.

As used herein, the term "proximal" refers to the closest end of an object. In contrast, the term "distal" refers to the farthest end of an object.

As used herein, the terms "front," "back," "rear," "upper," "lower," "right," and "left" in this description are merely used to identify the various elements as they are oriented in the FIGS., with "front," "back," and "rear" being relative apparatus. These terms are not meant to limit the element which they describe, as the various elements may be oriented differently in various applications.

As used herein, the term "vegetation" refers to living and dead organisms such as algae, moss, aquatic plants, and the like.

It will be understood that, although the terms first, second, etc. May be used herein to describe various elements, these elements should not be limited by these terms. These terms are only used to distinguish one element from another. For example, a first element could be termed a second element, and, similarly, a second element could be termed a first element without departing from the teachings of the disclosure.

The invention illustratively disclosed herein suitably may be practiced in the absence of any element which is not specifically disclosed herein.

FIG. 1 is a perspective view drawing illustrating an exemplary rake system 100 without a floating member for removing submerged vegetation and debris from ponds. The rake system 100 includes a handle 101, a frame 102, a line 103, and a spool 104. The handle 101 has a proximal end 101p and a distal end 101d. The frame 102 cuts the vegetation and scoops up the cut vegetation and unwanted debris as the rake system 100 is moved along the surface of the pond or the bottom of the pond.

Figure 2:
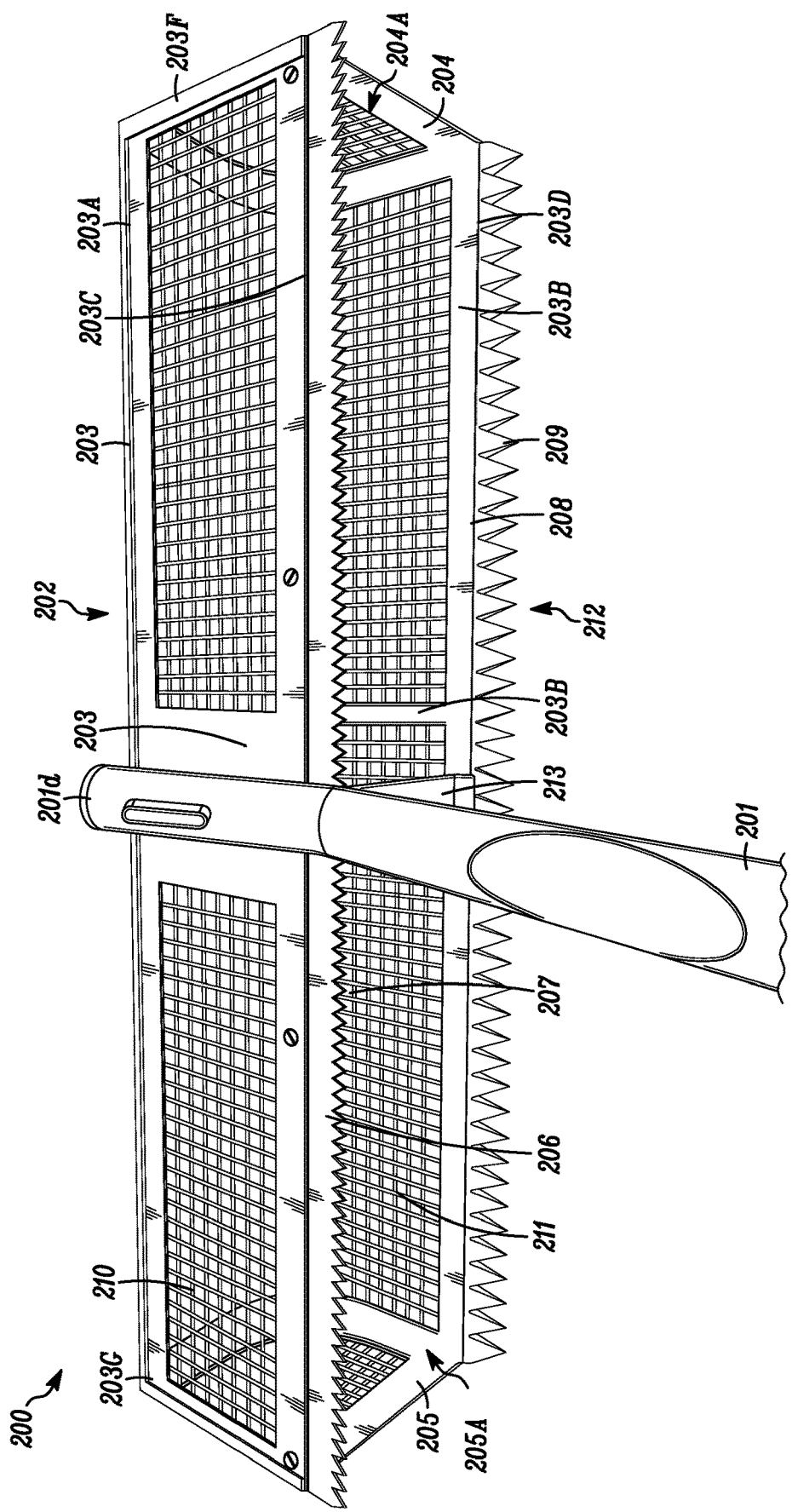
FIG. 2 is a perspective view drawing illustrating a frame without a floating member in an exemplary rake system.

FIG. 2 is a perspective view drawing illustrating a frame 202 without a floating member in an exemplary rake system 200. The rake system 200 includes a handle 201, a frame 202, and a line (not shown). The handle 201 has a proximal end (not shown) and a distal end 201d. The frame 202 has a first member 203, a second member 204, and a third member 205. The first member 203 has a first surface 203a, a second surface 203b, a first edge 203c, a second edge 203d, a third edge 203f, and a fourth edge 203g. The first surface 203a of the first member 203 is connected to the distal end of the handle 201d. The first edge 203c of the first member 203 is connected to a first cutting member 206 having two or more first teeth 207 extending parallel away from the first edge 203c. The second edge 203d of the first member 203 is connected to a second cutting member 208 having two or more second teeth 209, which extend from the second edge 203d and are downwardly sloped from the first surface 203a. The third edge 203f of the first member 203 is connected to a first surface 204a of the second member 204. The fourth edge 203g of the first member 203 is connected to a first surface 205a of the third member 205. The first member 203, the second member 204, and the third member 205 each include one or more entrapment meshes 210. The one or more entrapment meshes 210 each have one or more openings 211 smaller in size than the floating and submerged vegetation and debris to be collected. The first member 203, the second member 204, and the third member 205 together form a receptacle 212 having an open face at the first edge 203c and the second edge 203d of the first member 203. The first support member 213 is connected to the first edge 203c and to the second edge 203d of the first member 203. The two or more first teeth 207 each independently have a V-shaped cross section and rake the bottom of the pond and scoop the vegetation and unwanted debris into the receptacle 212. The two or more second teeth 209 each independently have a V-shaped cross section and cut the pond weeds close to the bottom of the pond and scoop the vegetation and unwanted debris into the receptacle 212.

Figure 3:
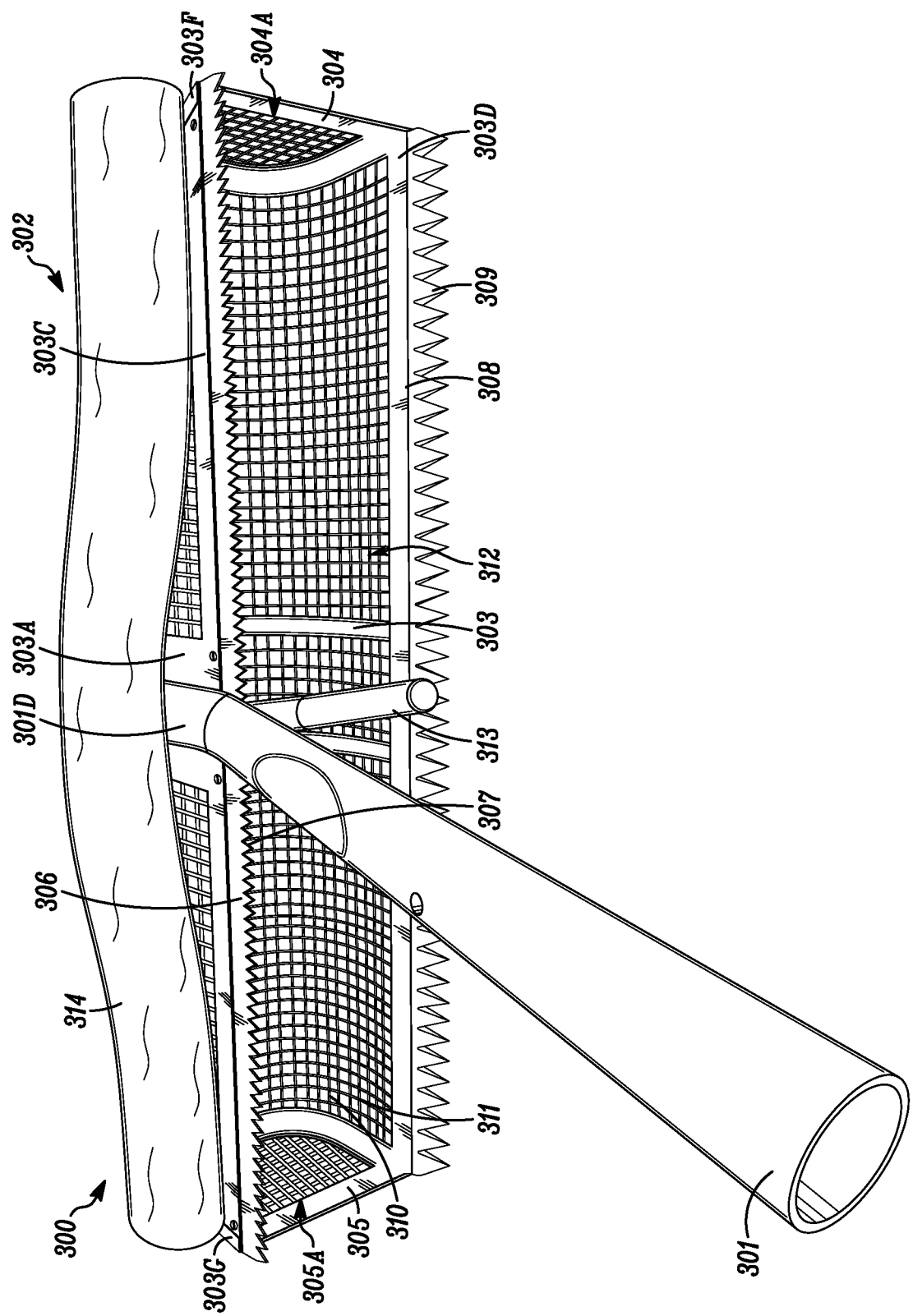
FIG. 3 is a perspective view drawing illustrating a frame with a floating member in an exemplary rake system.

FIG. 3 is a perspective view drawing illustrating a frame with a floating member in an exemplary rake system. The rake system 300 includes a handle 301, a frame 302, and a line (not shown). The handle 301 has a proximal end (not shown) and a distal end 301d. The frame 302 has a first member 303, a second member 304, and a third member 305. The first member 303 has a first surface 303a, a second surface 303b, a first edge 303c, a second edge 303d, a third edge 303f, and a fourth edge 303g. The first surface 303a of the first member 303 is connected to the distal end of the handle 301d. The first edge 303c of the first member 303 is connected to a first cutting member 306 having two or more first teeth 307 extending parallel away from the first edge 303c. The second edge 303d of the first member 303 is connected to a second cutting member 308 having two or more second teeth 309, which extend from the second edge 303d and are downwardly sloped from the first surface 303a. The third edge 303f of the first member 303 is connected to a first surface 304a of the second member 304. The fourth edge 303g of the first member 303 is connected to a first surface 305a of the third member 305. The first member 303, the second member 304, and the third member 305 each include one or more entrapment meshes 310. The one or more entrapment meshes 310 each have one or more openings 311 smaller in size than the floating and submerged vegetation and debris to be collected. The first member 303, the second member 304, and the third member 305 together form a receptacle 312 having an open face at the first edge 303c and the second edge 303d of the first member 303. The first support member 313 is connected to the first edge 303c and to the second edge 303d of the first member 303. The two or more first teeth 307 each independently have a V-shaped cross section and rake the bottom of the pond and scoop the vegetation and unwanted debris into the receptacle 312. The two or more second teeth 309 each independently have a V-shaped cross section and cut the pond weeds close to the bottom of the pond and scoop the vegetation and unwanted debris into the receptacle 312. The floating member 314 is detachably connected to the first surface 303a of the first member 303. The floating member 314 is a foam tube.

In one embodiment, the rake system 300 has a 28-inch wide frame 302 that is an aluminum screen basket with 1-inch teeth 309. In one embodiment, the first cutting member 306 is a 28-inch stainless steel blade. In one embodiment, the floating member 314 is a 28-inch foam tube that is releasably connected to the frame 302 with releasable zip ties. The line (not shown) is a 65-foot floating rope. In one embodiment, the handle 301 is connected to the frame 302 at about a 15-degree angle to allow for easy raking of the bottom surface of the pond. In one embodiment, the handle 301 includes two 4-foot sections (not shown) that are connected with stainless steel pop pins (not shown). In one embodiment, the rake system 300 weighs about 5 pounds.

Figure 4:
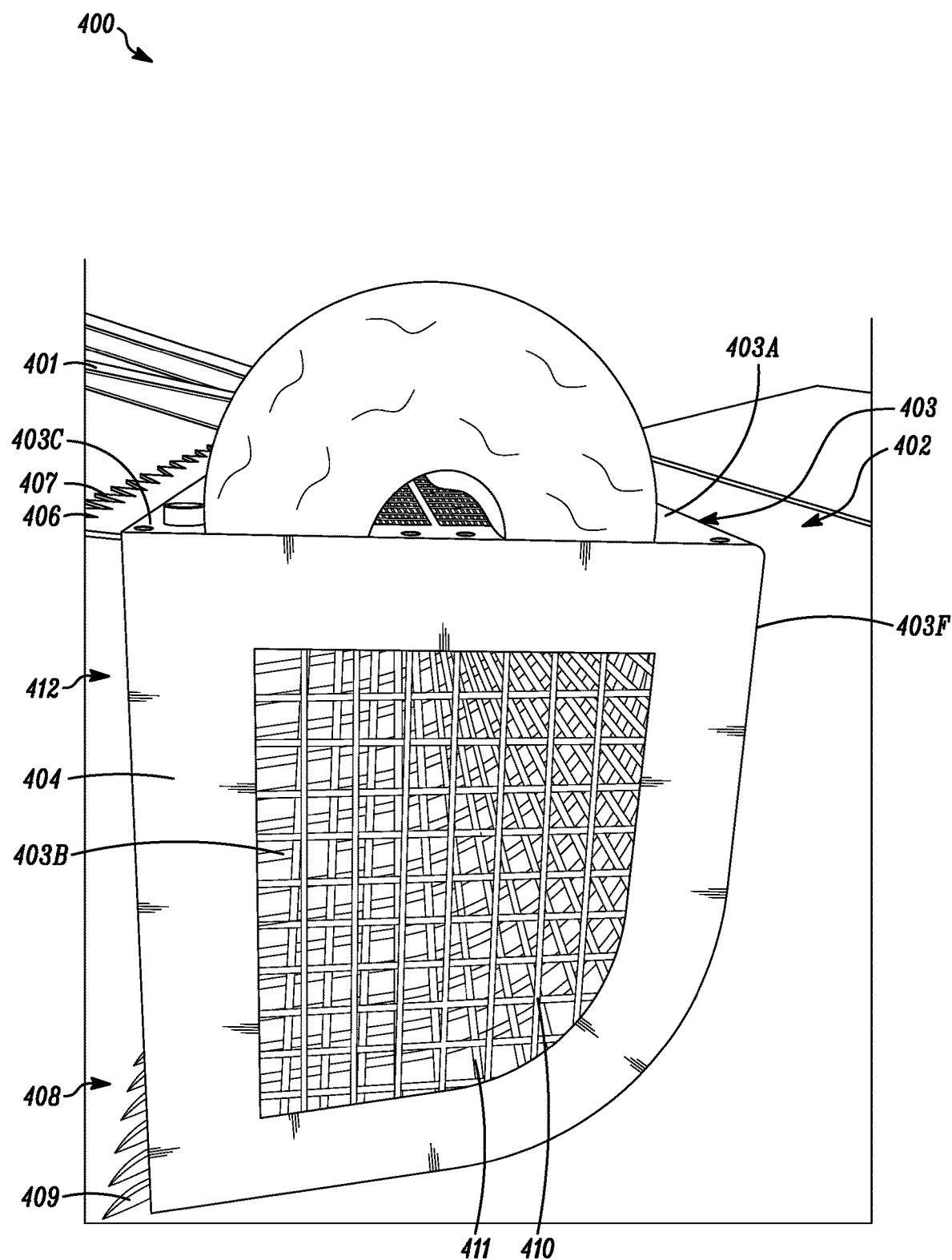
FIG. 4 is a side view drawing illustrating a frame with a floating member in an exemplary rake system.

FIG. 4 is a side view drawing illustrating a frame with a floating member in an exemplary rake system. The rake system 400 includes a handle 401, a frame 402, and a line (not shown). The handle 401 has a proximal end (not shown) and a distal end (not shown). The frame 402 has a first member 403, a second member 404, and a third member (not shown). The first member 403 has a first surface 403a, a second surface 403b, a first edge 403c, a second edge (not shown), a third edge 403f, and a fourth edge (not shown). The first surface 403a of the first member 403 is connected to the distal end of the handle 401. The first edge 403c of the first member 403 is connected to a first cutting member 406 having two or more first teeth 407 extending parallel away from the first edge 403c. The second edge (not shown) of the first member 403 is connected to a second cutting member 408 having two or more second teeth 409, which extend from the second edge (not shown) and are downwardly sloped from the first surface 403a. The third edge 403f of the first member 403 is connected to a first surface (not shown) of the second member 404. The fourth edge (not shown) of the first member 403 is connected to a first surface (not shown) of the third member (not shown). The first member 403, the second member 404, and the third member 405 each include one or more entrapment meshes 410. The one or more entrapment meshes 410 each have one or more openings 411 smaller in size than the floating and submerged vegetation and debris to be collected. The first member 403, the second member 404, and the third member (not shown) together form a receptable 412 having an open face at the first edge 403*c* and the second edge 403*d* of the first member 403. The first support member (not shown) is connected to the first edge 403*c* of the first member 403 and to the second edge 403*d* of the first member 403. The two or more first teeth 407 each independently have a V-shaped cross section and rake the bottom of the pond and scoop the vegetation and unwanted debris into the receptable 412 formed in the frame 402. The two or more second teeth 409 each independently have a V-shaped cross section and cut the pond weeds close to the bottom of the pond and scoop the vegetation and unwanted debris into the receptable 412 formed in the frame 402. The floating member 413 is detachably connected to the first surface 403*a* of the first member 403. The floating member 413 is a foam tube.

Figure 5:
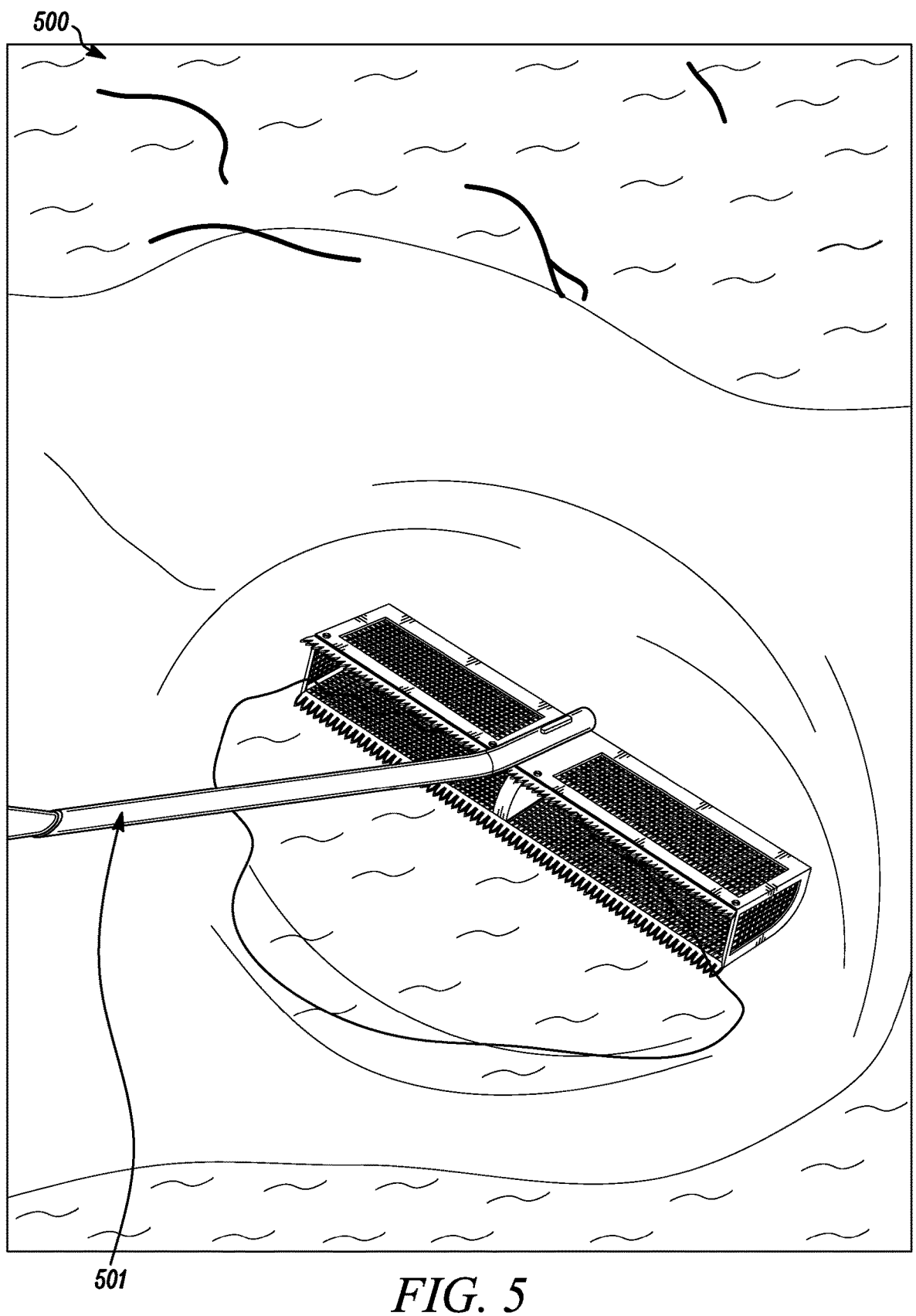
FIG. 5 is a drawing illustrating an exemplary method of using an exemplary rake system to clean the bottom of a pond.

FIG. 5 is a drawing illustrating an exemplary method of using an exemplary rake system to clean the bottom of a pond. The method 500 includes: removing the floating member (not shown) from the rake system 501, unwinding the line (not shown); tossing the rake system 501 into the pond, and pulling the line (not shown) to drag the rake system 501 along the bottom of the pond.

Figure 6:
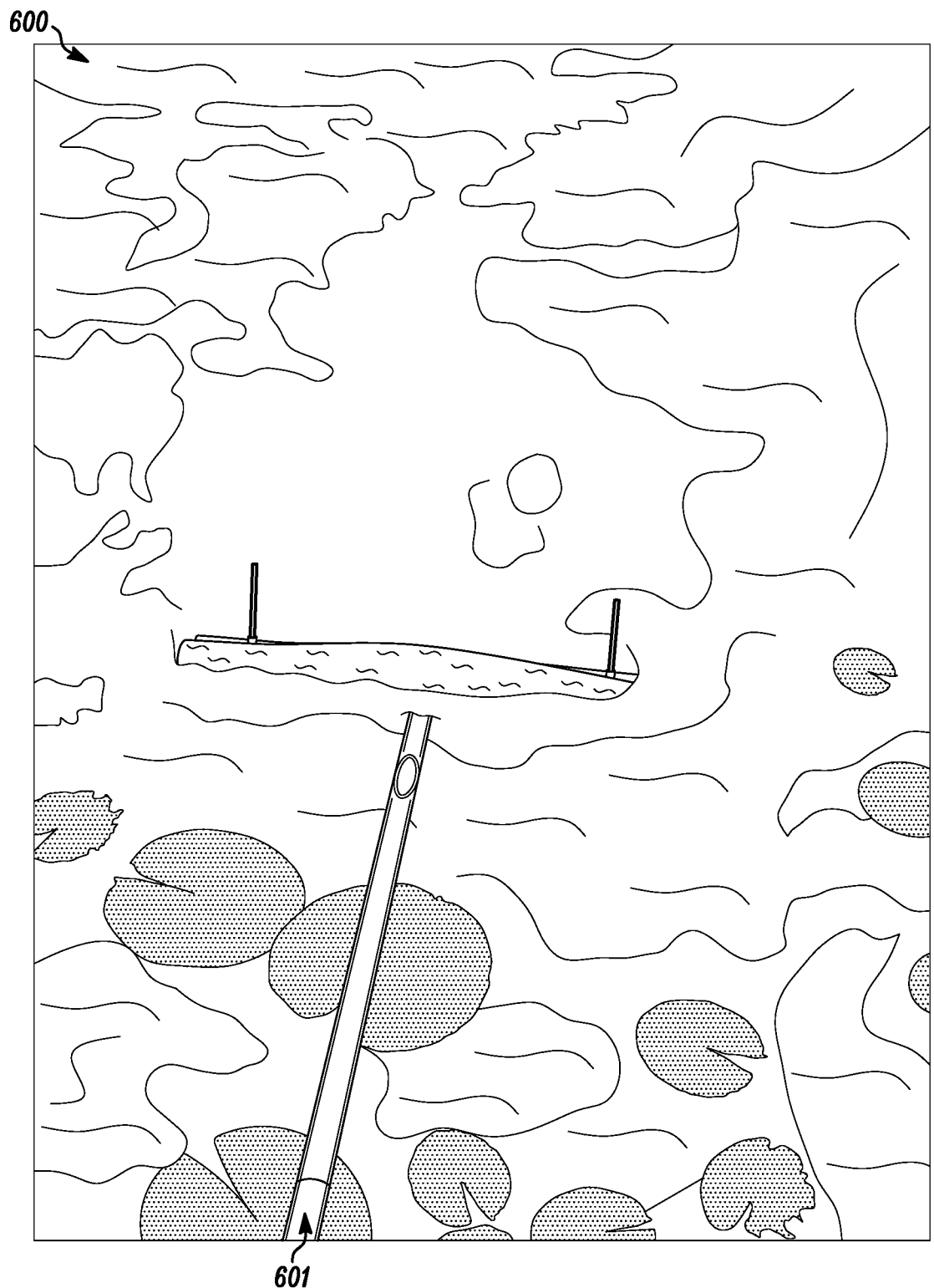
FIG. 6 is a drawing illustrating an exemplary method of using an exemplary rake system to clean the bottom of a pond.

FIG. 6 is a drawing illustrating an exemplary method of using an exemplary rake system to clean the surface of a pond. The method 600 includes: unwinding the line (not shown); tossing the rake system 601 into the pond, and pulling the line (not shown) to drag the rake system 601 along the surface of the pond.

In the claims provided herein, the steps specified to be taken in a claimed method or process may be carried out in any order without departing from the principles of the invention, except when a temporal or operational sequence is explicitly defined by claim language. Recitation in a claim to the effect that first a step is performed then several other steps are performed shall be taken to mean that the first step is performed before any of the other steps, but the other steps may be performed in any sequence unless a sequence is further specified within the other steps. For example, claim elements that recite "first A, then B, C, and D, and lastly E" shall be construed to mean step A must be first, step E must be last, but steps B, C, and D may be carried out in any sequence between steps A and E and the process of that sequence will still fall within the four corners of the claim.

Furthermore, in the claims provided herein, specified steps may be carried out concurrently unless explicit claim language requires that they be carried out separately or as parts of different processing operations. For example, a claimed step of doing X and a claimed step of doing Y may be conducted simultaneously within a single operation, and the resulting process will be covered by the claim. Thus, a step of doing X, a step of doing Y, and a step of doing Z may be conducted simultaneously within a single process step, or in two separate process steps, or in three separate process steps, and that process will still fall within the four corners of a claim that recites those three steps.

Similarly, except as explicitly required by claim language, a single substance or component may meet more than a single functional requirement, provided that the single substance or component fulfills the more than one functional requirement as specified by claim language.

All patents, patent applications, publications, scientific articles, web sites, and other documents and materials referenced or mentioned herein are indicative of the levels of skill of those skilled in the art to which the invention pertains, and each such referenced document and material is hereby incorporated by reference to the same extent as if it had been incorporated by reference in its entirety individually or set forth herein in its entirety. Additionally, all claims in this application, and all priority applications, including but not limited to original claims, are hereby incorporated in their entirety into, and form a part of, the written description of the invention.

Applicant reserves the right to physically incorporate into this specification any and all materials and information from any such patents, applications, publications, scientific articles, web sites, electronically available information, and other referenced materials or documents. Applicant reserves the right to physically incorporate into any part of this document, including any part of the written description, the claims referred to above including but not limited to any original claims.

What is claimed is:

1. A rake system for removing floating and submerged vegetation and debris from ponds, the rake system comprising:
   a handle having a proximal end and a distal end;
   a frame having a first member, a second member, and a third member,
     wherein the first member has a first surface, a second surface, a first edge, a second edge, a third edge, and a fourth edge,
     wherein the first surface of the first member is directly connected and fixed to the distal end of the handle,
     wherein the distal end of the handle and the first surface of the first member are both in the same plane, the plane defined by the top of the first member, at relatively the same angle,
     wherein the proximal end of the handle is angled above the distal end of the handle and oriented toward the first edge of the first member,
     wherein the first edge of the first member is connected to a first cutting member having two or more first teeth extending parallel away from the first edge,
     wherein the second edge of the first member is connected to a second cutting member having two or more second teeth,
     wherein the second cutting member having two or more second teeth extending from the second edge and are downwardly curved from the first surface,
     wherein the third edge of the first member is connected to a first surface of the second member,
     wherein the fourth edge of the first member is connected to a first surface of the third member,
     wherein the first member, the second member, the third member, and a combination thereof each independently comprise one or more entrapment meshes,
     wherein the first member, the second member, and the third member form a receptacle having an open face at the first edge and the second edge of the first member and having a first opposed side and a second opposed side; and
   a line connected the proximal end of the handle.

2. The rake system of claim 1, further comprising a first support member connected to the first edge of the first member and to the second edge of the first member.

3. The rake system of claim 1, wherein the two or more first teeth each independently have a V-shaped cross section.

4. The rake system of claim 1, wherein the two or more second teeth each independently have a V-shaped cross section.

5. The rake system of claim 1, wherein the two or more first teeth are each independently larger than each of the two or more second teeth.

6. The rake system of claim 1, further comprising a floating member detachably connected to the first surface of the first member.

7. The rake system of claim 6, wherein the floating member comprises a foam.

8. The rake system of claim 1, further comprising a spool connected to the proximal end of the handle.

9. A rake system for removing floating and submerged vegetation and debris from ponds, the rake system comprising:
- a handle having a proximal end and a distal end;
- a metal frame having a first member, a second member, and a third member,
  - wherein the first member has a first surface, a second surface, a first edge, a second edge, a third edge, and a fourth edge,
  - wherein the first surface of the first member is directly connected and fixed to the distal end of the handle,
  - wherein the distal end of the handle and the first surface of the first member are both in the same plane, the plane defined by the top of the first member, at relatively the same angle,
  - wherein the proximal end of the handle is angled above the distal end of the handle and oriented toward the first edge of the first member,
  - wherein the first edge of the first member is connected to a first cutting member having two or more first teeth extending parallel away from the first edge,
  - wherein the two or more first teeth each independently have a V-shaped cross section,
  - wherein the second edge of the first member is connected to a second cutting member having two or more second teeth,
  - wherein the two or more second teeth each independently have a V-shaped cross section,
  - wherein the second cutting member having two or more second teeth extend from the second edge and are downwardly curved from the first surface,
  - wherein the third edge of the first member is connected to a first surface of the second member,
  - wherein the fourth edge of the first member is connected to a first surface of the third member,
  - wherein the first member, the second member, the third member, and a combination thereof each independently comprise one or more entrapment meshes,
  - wherein the first member, the second member, and the third member form a receptacle having an open face at the first edge and the second edge of the first member and having a first opposed side and a second opposed side,
- a floating member detachably connected to the first surface of the first member;
- a line connected the proximal end of the handle;
- a spool connected to the proximal end of the handle, and wherein the line is wound around the spool.

10. The rake system of claim 9, wherein the handle comprises a fiberglass tube.

11. The rake system of claim 9, further comprising a first support member connected to the first edge of the first member and to the second edge of the first member.

12. The rake system of claim 9, wherein the first member, the second member, and the third member each independently comprise aluminum.

13. The rake system of claim 9, wherein the first cutting member comprises a stainless steel.

14. The rake system of claim 9, wherein the second cutting member comprises aluminum.

15. The rake system of claim 9, wherein the two or more first teeth are each independently larger than each of the two or more second teeth.

16. The rake system of claim 1, wherein the handle is tubular.

17. The rake system of claim 1, wherein the proximal end of the handle is angled above the distal end of the handle at about a 15-degree angle.

18. The rake system of claim 9, wherein the handle is tubular.

19. The rake system of claim 9, wherein the proximal end of the handle is angled above the distal end of the handle at about a 15-degree angle.

* * * * *